April 9, 1940.  H. BOHMER, JR., ET AL  2,196,953
GASKET PRESSURE CONTROL
Filed April 4, 1938   3 Sheets-Sheet 1
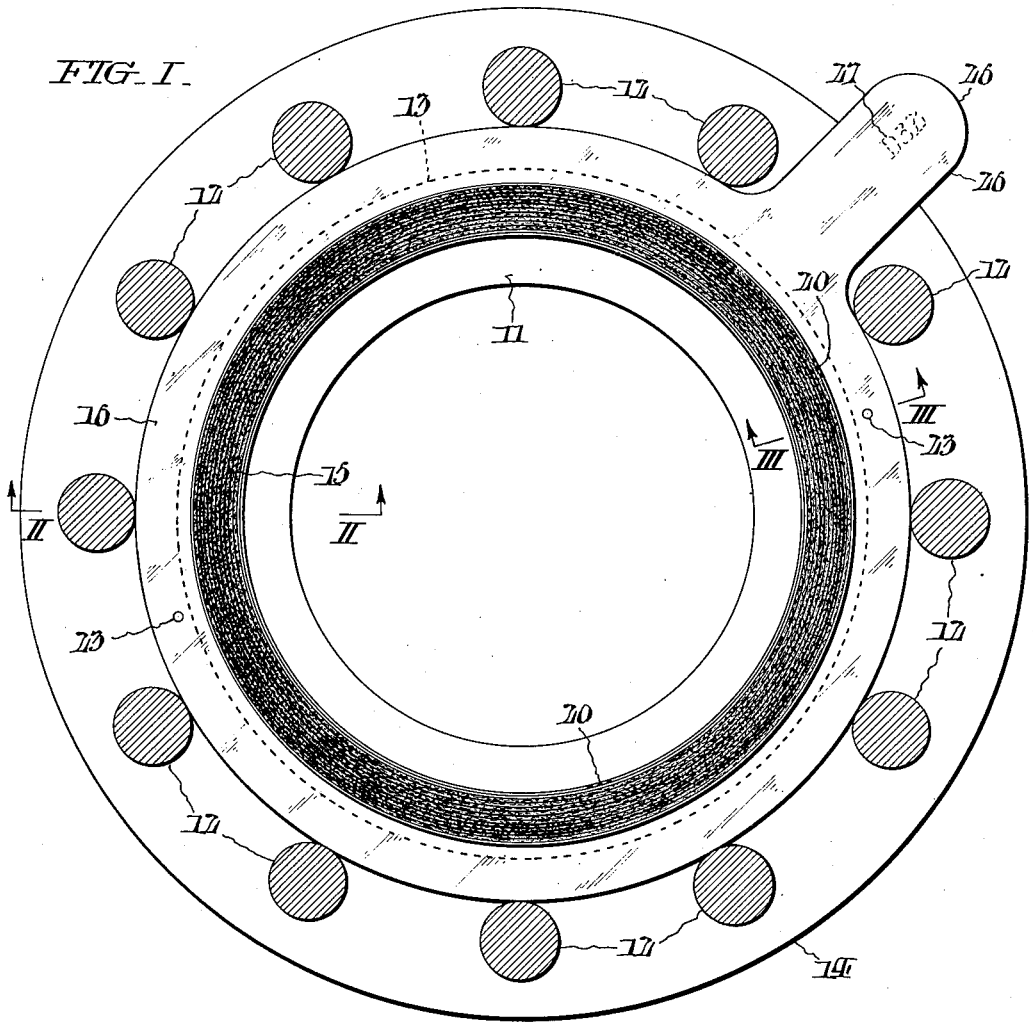
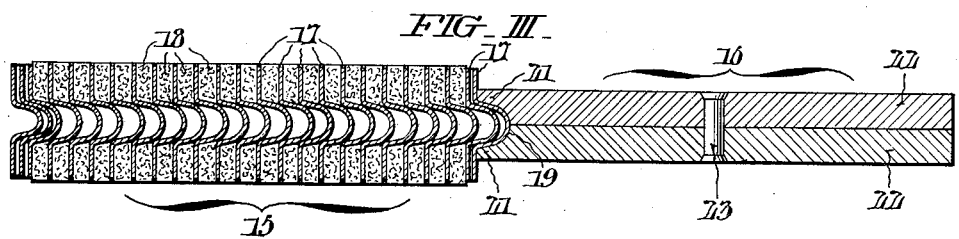

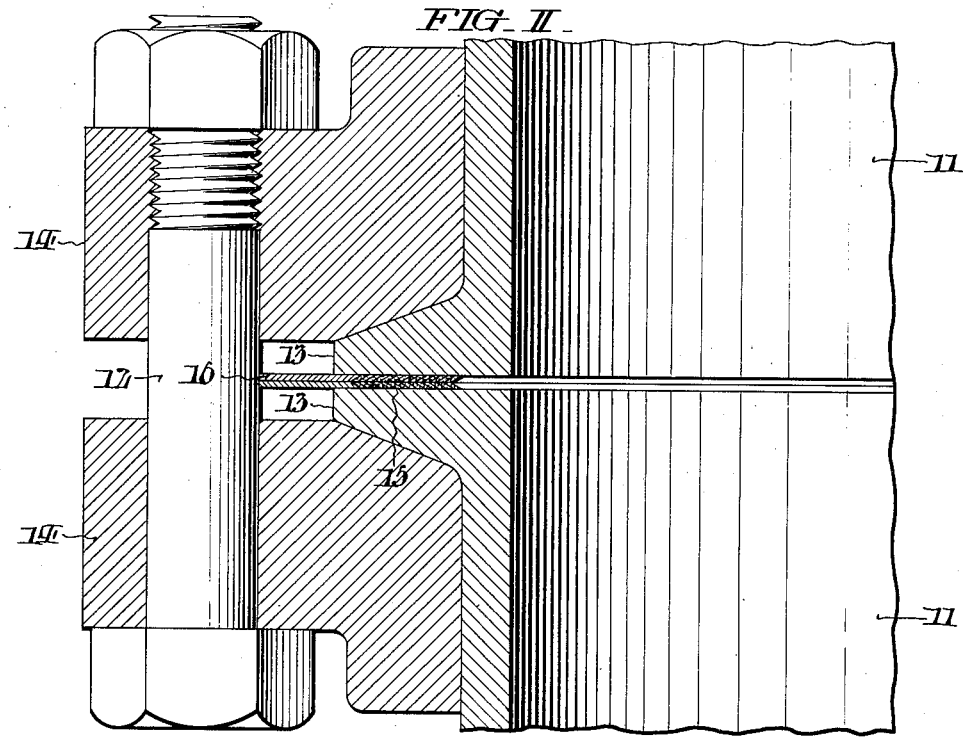
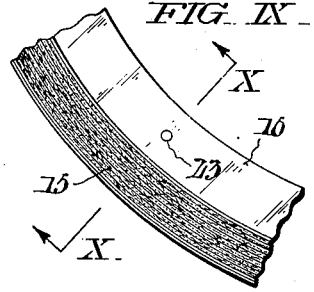
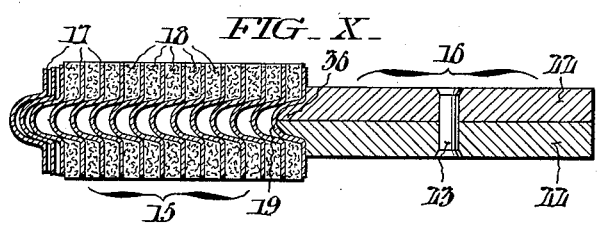
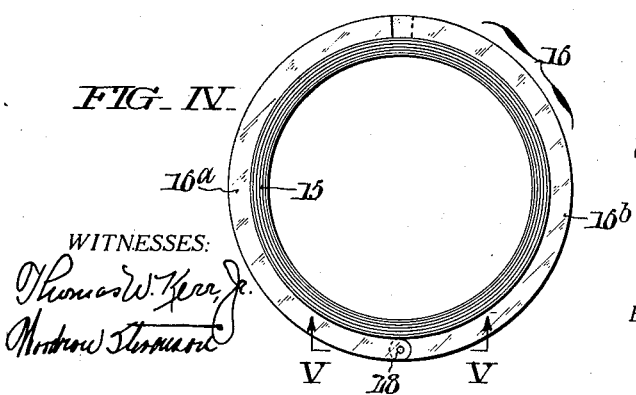
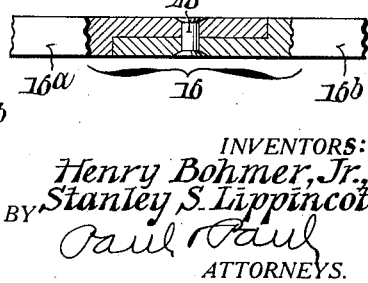

April 9, 1940.  H. BOHMER, JR., ET AL  2,196,953
GASKET PRESSURE CONTROL
Filed April 4, 1938  3 Sheets-Sheet 3
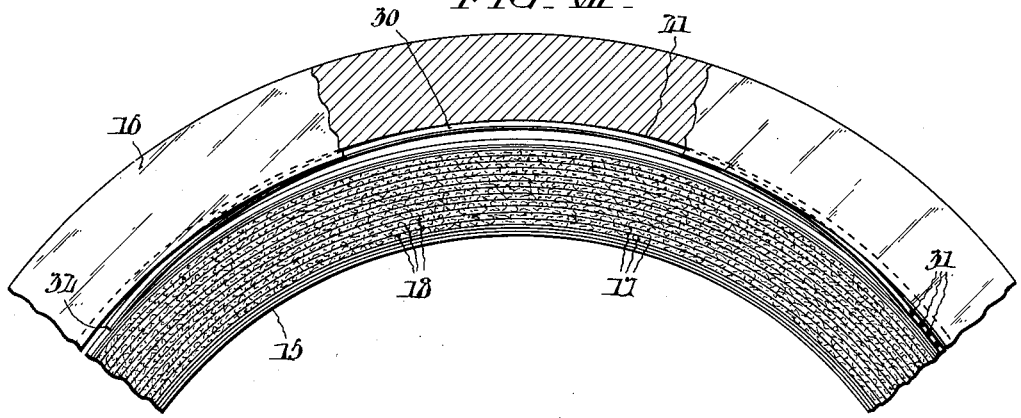
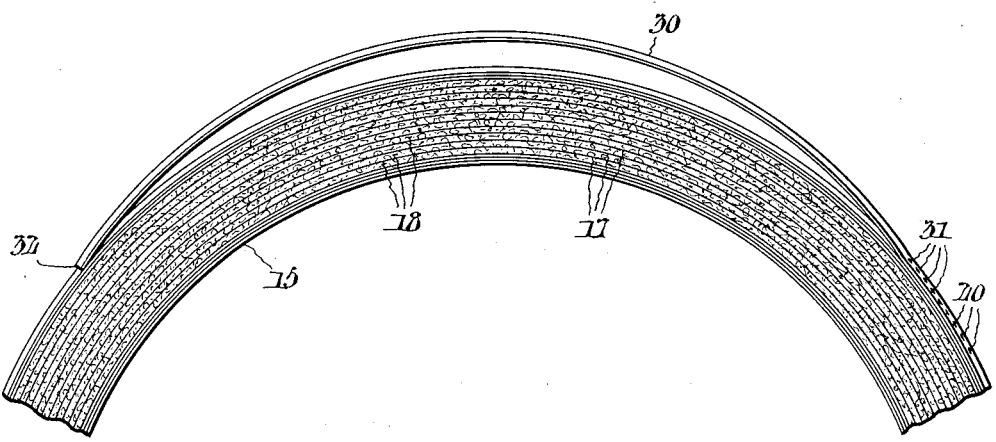
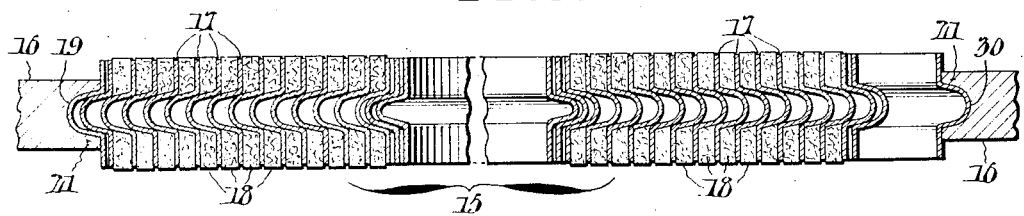
INVENTORS:
Henry Bohmer, Jr., &
Stanley S. Lippincott, Patented Apr. 9, 1940

2,196,953

UNITED STATES PATENT OFFICE 2,196,953

GASKET PRESSURE CONTROL

Henry Bohmer, Jr., Woodbury Heights, and Stanley S. Lippincott, Palmyra, N. J., assignors to "Flexitallic" Gasket Company, Camden, N. J., a corporation of New Jersey Application April 4, 1938, Serial No. 199,896

4 Claims. (Cl. 288—27)

This invention relates to gaskets, and especially to the control of the pressure on a gasket in a joint, so as to assure fluid tightness without risk of overloading either the gasket or the joint bolts or the like. The proper pressure or bonding load on a gasket packing in a joint depends on the service or operating pressure in the joint; and when used with different pressures, the same gasket requires different bonding loads to give the best results. This has been recognized by providing joints bolts of different sizes for different service conditions, and by using wrenches of different lengths to tighten the bolts. This, however, is but a crude and unsatisfactory way of determining bolt stresses and gasket loadings.

In accordance with our invention, we provide the gasket not only with a packing to make the joint pressure-tight, but also with a compression gauge or stop for determining and limiting the bonding pressure on the packing and the stresses and strains in the joint bolts. This assures employment of sufficient pressure, while at the same time preventing injurious or undesirable overloading of the packing or of the bolts. The gauge device may be integrally included in the structure of the gasket, or may have the separate or separable character of an adapter, so that a given gasket packing may be equipped with any of several suitable adapters, according to the service pressure under which it is to be used in a particular case. In suitable forms of embodiment, such as hereinafter disclosed, the adapter serves to center the gasket properly in a joint, and for easy identification of the gasket after installation, without disassembling or disturbing the joint. Other features and advantages of the invention will appear from the following description of certain illustrative species or forms of embodiment, and from the drawings. All the features and combinations shown or described are of our invention, so far as novel over the prior art.

In the drawings, Fig. I is a facial view of a flanged pipe joint including one form of gasket embodying our invention, the joint bolts being shown in section.

Fig. II shows a partial section through the joint illustrating in Fig. I, taken as indicated by the line and arrows II—II in that figure.

Fig. III shows a section through the gasket illustrated in Fig. I, taken as indicated by the line and arrows III—III in Fig. I, on a larger scale.

Fig. IV is a facial or side view of a gasket somewhat different from that illustrated in Figs. I—III; and Fig. V is a fragmentary sectional view through the gasket shown in Fig. IV, taken as indicated by the line and arrows V—V in that figure.

Fig. VI is a diametral sectional view illustrating yet another form of gasket, the outer and central portions of the gasket being omitted for the sake of compactness of illustration.

Fig. VII is a fragmentary facial or side view of the gasket shown in Fig. VI, with one of the parts partially broken away and in section along the central plane of the gasket.

Fig. VIII is a view similar to Fig. VII with one of the parts of the gasket omitted.

Fig. IX is a fragmentary facial or side view of yet another form of gasket; and Fig. X is a fragmentary sectional view on a larger scale, the plane of section being indicated by the line and arrows X—X in Fig. IX.

Figs. I and II illustrate a pipe joint consisting of flanged pipe sections 11, 11 secured together by bolts 12. In this particular joint, the ends of the pipe sections 11, 11 have integral end flanges 13, 13, and the bolts 12 extend through separate annular flanges 14, 14 engaged around the pipe sections and bearing on said flanges 13, 13. However, it will be understood that the particular construction of the joint is immaterial, so far as our present invention is concerned.

Between the joint flanges 13, 13 is interposed our gasket comprising a packing ring 15 and a spacing or gauge ring 16. The packing ring 15, which is relied on to make the joint fluid-tight under service pressure in the pipe-line, is held elastically compressed between the flanges 13, 13 by the tension on the bolts 12. The spacing ring 16, shown as a flat metal ring that is substantially incompressible, serves as a stop piece to limit the pressure which can be put on the packing ring 15 when the bolts 12 are tightened up: i. e., its thickness is determined according to the design of the packing ring and the pressure in the pipe line, so that it serves as a compression gauge to assure a correct bonding pressure on the packing ring.

As shown in Figs. I, II, and III, the flat packing ring 15 is composed of convolutions of metal strip 17, preferably alternating with suitably heat-resistant compressible strip material 18 such as asbestos. The metal strip convolutions 17 are embossed circumferentially and outward, and are interlocked by interesting interengagement. In the present instance, the embossment of the metal strip 17 consists of a longitudinal rib 19 along the center of the strip, of trough-like arcuate cross-section, although other forms of embossment might be used. Preferably, the convolutions 17 are all formed of one continuous length of metal strip, spirally wound. Separate asbestos strips 18 are shown at opposite sides of the rib 19. The asbestos strips 18 may be omitted between some of the innermost and outermost convolutions 17, as shown in Fig. III. The ends of the innermost and outermost convolutions 17 may preferably be secured (as by welding) to the convolutions directly within them, to prevent uncoiling of the metal strip 17 either inward or outward, and to limit expansion of the packing ring 15, as indicated at 20. The packing ring 15 is elastic and compressible axially, by virtue of the elasticity and the longitudinal embossment of the convolutions 17. The particular construction of packing ring 15 here illustrated corresponds substantially to that shown and described in our Patent No. 2,027,299, granted January 7, 1936.

As shown in Figs. I, II, and III, the rings 15 and 16 are engaged edgewise one around the other, and are interlocked at their interengaged edges, by appropriate formation of the edge 21 of the spacing ring 16 and engagement thereof with the corresponding edge (convolution) of the packing ring 15. In the instance illustrated in Figs. I, II, and III, the spacing ring 16 surrounds the packing ring 15 and peripherally engages the joint bolts 12, so as to center the packing ring 15 properly between the joint flanges 13, 13; and the inner edge of the ring 16 is recessed or grooved to engage over the embossment 19 at the outer edge of the ring 15. The proper thickness for the spacing or gauge ring 16 in each particular case is easily calculable from the design of the packing ring 15 and the service pressure in the pipe line, upon the principle that the elastic pressure between the flanges 13, 13 and the edges of the convolutions 17 should make their friction with the pipe surfaces at 13, 13 more than sufficient to resist the internal fluid pressure on the annular area of the packing ring 15 when compressed in the joint. Any one of several spacing rings 16 (of different thicknesses) may be fitted to a given packing ring 15, according to the pressure in the line where the gasket is to be used.

As shown in Fig. III, provision is made for easily removing the spacing ring 16 from the packing ring 15, when desired, by making the ring 16 of parts detachable and displaceable from one another, to release them from their interlocking engagement with the ring 15 or its edge rib 19. In this instance, the spacing ring 16 consists of two superposed flat rings 22, 22, each of substantially half the desired thickness of the ring 16, with their adjacent inner corners reduced (in a curve resembling an ogee) to provide the interlocking groove 21 when they are assembled. If desired, they may be detachably secured together, as by rivets indicated at 23. These rivets 23 may be only slightly headed in their countersinks in the rings 22, 22, so that they can easily be driven out of their holes when it is desired to separate the rings.

As shown in Fig. I, the spacing ring 16 has a radial projection 26 which extends between the bolts 12 out beyond the joint flanges 14, 14, and may carry markings 27 on its laterally exposed outer portion, for identifying the gasket.

Figs. IV and V illustrate another construction of a spacing ring 16 in parts displaceable relative to one another to release them from interlocking engagement with the packing ring 15. Here the packing ring 16a consists of semi-circular arcuate segments 16a, 16b whose ends are reduced and interlapped. At one side of the ring, the ends of the segments 16a, 16b may be pivoted together, as by a rivet 28. When the assembly of parts 15 and 16 is placed in a joint amongst the joint bolts 12, the latter hold the parts 16a, 16b together properly interlocked with the external embossment 19 of the packing ring 16.

Figs. VI, VII, and VIII illustrate yet another way of detachably interlocking the packing ring 15 with the spacing ring 16. Here the spacing ring 16 may be an unbroken annulus, all in one piece, with a groove 21 in its inner edge. As best shown in Figs. VII and VIII, the packing ring 15 has a length of outward and longitudinally embossed "convolution" strip material 30 attached to the outer edge of the packing ring, as by spot welding at 31, and extending around and along the outer edge of said packing ring to its own free end 32. As shown in Fig. VIII, this strip 30 consists of a portion of the outermost convolution of the packing ring itself, prolonged beyond its attachment to the underlying convolution 17 at 28. The outside diameter of the packing ring 15 is somewhat less than the internal diameter of the spacing ring 16 at the sides of its groove 21, so that by pressing the springy strip 30 in against the edge of the packing ring 15, the latter can be inserted into the spacing ring 16 and interlocked with it by engagement of the external embossments of the packing ring 15 and of the strip 30 in the groove 21. With equal facility, the packing ring 15 can be disengaged from the spacing ring 16 and removed therefrom, when desired.

Figs. IX and X illustrate a reversal of the construction shown in Figs. I, II, and III, in which the spacing ring 16 is arranged inside the packing ring 15, instead of outside as in Figs. I—VIII, and has its outer edge provided with a ridge or tongue 36 for internally engaging in the groove in the inner edge of the packing ring formed by the longitudinal outward embossment 19 of its metal strip convolutions 17. Thus arranged within the packing ring 15, the spacing ring 16 serves the purpose of a gauge in preventing the packing ring 15 from being over-compressed between the pipe ends.

In using a gasket equipped with our compression gauge, in any of its possible forms, the gasket is placed in the joint and the joint-bolts 12 are initially drawn up, as usual, by "going around the joint" with a wrench of the usual proper length, until the parts have been brought to a bearing all around. The workman is instructed that after proceeding thus far he is to continue going around the joint until a solid, unyielding resistance to further tightening of each bolt 12 is detected, and then to stop. Such solid resistance all around the joint denotes that the joint flanges 13, 13 have come to bear on the unyielding spacing ring 16, and that the packing ring 15 has everywhere been compressed to the correct bonding pressure. Thereafter, any further efforts to tighten up on the joint bolts 12 could at most only strip their threads, without further compressing the gasket packing 15. By desisting from tightening the bolts just as soon as a solid resistance is met with at each, overstressing or overstraining of the bolts is definitely avoided.

Having thus described our invention, we claim:

1. A packing gasket comprising a compressible packing component and a non-compressible gauge component, one within the other, the gauge component being composed of complemental sections which jointly provide means for circumferentially interlocking with the packing component, and said gauge component being of a thickness less than that of the packing component to limit the extent to which the latter may be compressed; and means for securing together the two sections of the gauge component.

2. A gasket according to claim 1 in which the gauge component comprises two sections which meet in the central plane of the gasket.

3. A gasket according to claim 1 in which the gauge component comprises two flat sections which meet in the central plane of the gasket, and in which said sections jointly provide a circumferential recess which engage a corresponding circumferential ridge about the packing component.

4. A packing gasket according to claim 1 in which the gauge component comprises semicircular segments pivotally connected together at one end for capacity to be assembled around the packing component after the latter is formed and said sections have the free ends reduced and interlapped whereby said gauge component is rendered readily applicable to, or removable from, the packing component.

HENRY BOHMER, JR.
STANLEY S. LIPPINCOTT.